E. J. SCHULENBURG

2,673,973

TRAFFIC CONTROL SYSTEM

Filed June 1, 1951

E.W. Amber

N.S. Amber

N.S. Green

N.S. Red

E.W. Green

E.W. Red

INVENTOR.

Edward J. Schulenburg
By: Wallenstein & Spangenberg Attys.

Fig. 3.

INVENTOR.
Edward J. Schulenburg
By: Wallenstein & Spangenberg
attys.

Fig. 4.

E.W. Amber

N.S. Amber

N.S. Green

N.S. Red

E.W. Green

E.W. Red

Fig. 5.

INVENTOR.
Edward J. Schulenburg
By Wallenstein & Spangenberg attys.

Patented Mar. 30, 1954

2,673,973

UNITED STATES PATENT OFFICE 2,673,973

TRAFFIC CONTROL SYSTEM

Edward J. Schulenburg, Danville, Ill.

Application June 1, 1951, Serial No. 229,413

19 Claims. (Cl. 340—41)

This invention relates to control means for traffic control systems having stop, go and change signals for a plurality of directions.

The principal object of this invention is to provide an improved control means for such traffic control systems wherein the stop, go and traffic change signals are operated through recurring control cycles, each having one portion comprising traffic change and stop periods for one direction and another portion comprising traffic change and stop periods for another direction, wherein each control cycle portion is started at predetermined time intervals, wherein the traffic change period in each control cycle portion is terminated at predetermined time intervals following starting of each control cycle portion, wherein the predetermined time intervals at which the control cycle portions are started and hence the relative extents of the control cycle portions may be adjusted without affecting the extents of the traffic change periods, wherein the predetermined time intervals at which the traffic change periods are terminated and hence the extents of the traffic change periods may be adjusted without affecting the extents of the control cycle portions, and wherein the control means may be synchronized during a stop period in one of the control cycle portions.

The control means of this invention is simple in construction and foolproof in operation, and faithfully operates to produce the desired control functions in accordance with the simple adjustments made thereto.

Briefly, the control means includes progressively operated control switch means for controlling the stop, go and traffic change signals through the recurring control cycles. A first adjustable timing means operates the control switch means to start each control cycle portion (consisting of a traffic change period and a stop period) at predetermined time intervals. A second adjustable timing means operates the control switch means during each control cycle portion to terminate the traffic change period and start the stop period at predetermined times following the starting of the control cycle portion. Thus, the extents of the control cycle portions are independent of the extents of the traffic change periods and vice versa and they may be independently adjusted by adjusting the respective timing means. The two adjustable timing means are interlocked with the control switch means so that proper sequencing is assured.

The progressively operated control switch means may include a plurality of cam actuated switches such as disclosed in my copending application Serial No. 229,412, filed June 1, 1951, and these cam actuated switches may be sequentially operated by a solenoid actuator such as disclosed in my copending application Serial No. 229,411, filed June 1, 1951. The first timing means may include a normally continuously operating constant speed motor operating a timing dial having adjustable cam members for operating a switch means. The second timing means may include time delay relay means or it may include a normally inactive constant speed motor operating a timing dial having adjustable cam members for operating a switch means. The switch means of the two timing means control the solenoid actuator, the switch means of the first timing means operating through interlock switch means controlled by the solenoid actuator and the second timing means being controlled by switch means also controlled by the solenoid actuator.

Further objects of this invention reside in the details of construction of the traffic control means and in the cooperative relationship between the component parts thereof.

Other objects and advantages will become apparent to those skilled in the art upon reference to the accompanying specification, claims and drawings, in which:

Figures 4, 5:
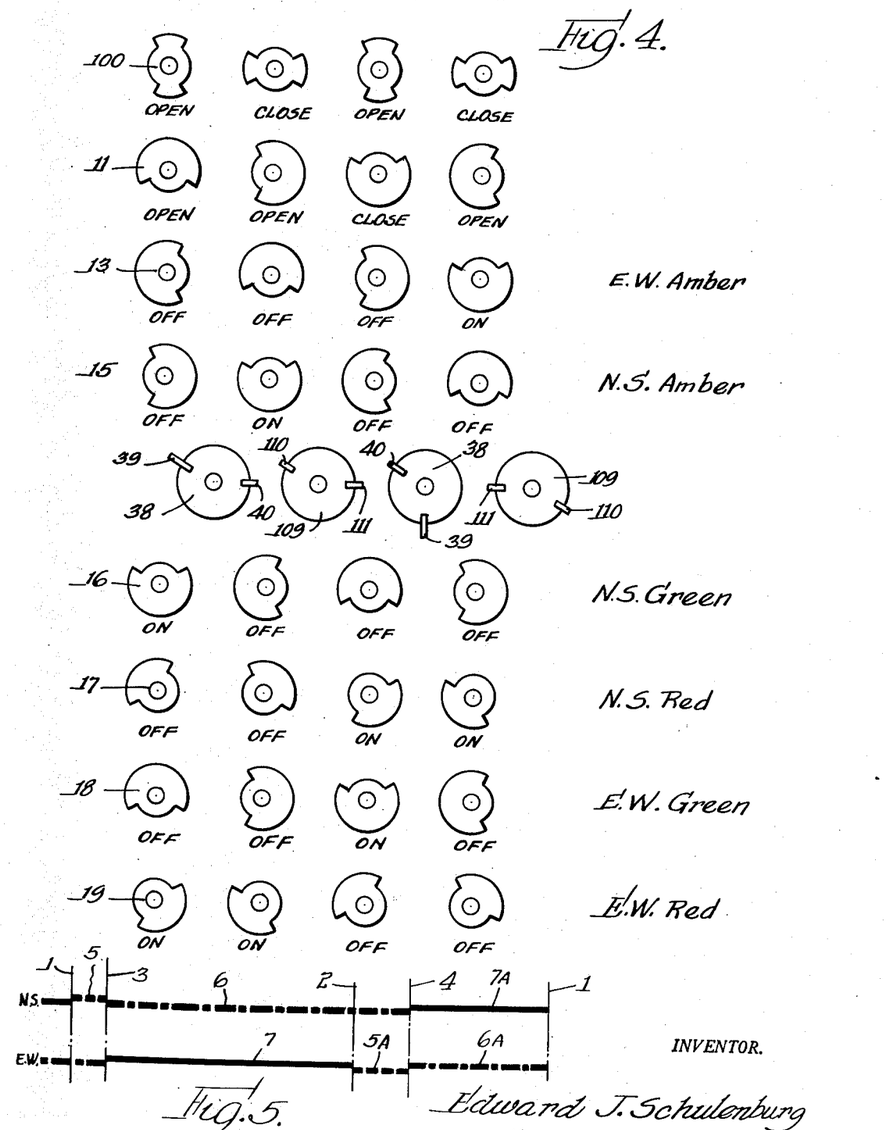
Fig. 4 is a diagram similar to Fig. 2, but illustrating the positions of the cams for operating the control switch means of the form of the invention illustrated in Fig. 3.
Fig. 5 is a diagram illustrating one of the recurring control cycles and the traffic change and stop periods along with go periods comprising the control cycle.

The ultimate operation of the control means of both forms of the invention is diagrammatically illustrated in Fig. 5 wherein there is completely illustrated one of the recurring control cycles. The diagram illustrates traffic control in two directions, namely, north-south (N. S.) and east-west (E. W.). A complete control cycle is contained between the lines l—l, The complete control cycle is broken up into two control cycle portions, one extending between the lines 1—2 and the other extending between the lines 2—1. The first control cycle portion has a traffic change period occurring between the lines 1—3 and a stop and go portion between the lines 3—2. Likewise, the second control cycle portion has a traffic change period between the lines 2—4 and a stop and go period between the lines 4—1. Beginning with the first control cycle portion, there appears a traffic change signal designated by the dotted line 5 for the north-south direction. Upon termination of this traffic change period the north-south direction has a stop signal designated by the broken line 6 and the east-west direction has a go signal designated by the solid line 7. At the termination of the first control cycle portion there then appears a traffic change signal in the east-west direction designated by the dotted line 5-A and following this traffic change period there appears a stop signal in the east-west direction, as designated by the broken line 6-A, and a go signal in the north-south direction, as designated by the solid line 7-A. While, as illustrated, the stop signal 6 of the first control cycle portion extends over into the traffic change period of the second control cycle period and, likewise, the stop signal 6-A of the second control cycle portion extends over into the traffic change period of the first control cycle portion, these stop signals, if desired, may be terminated at the ends of their respective control cycle periods and traffic change signals substituted therefor. While two directions of traffic control have been illustrated, it is apparent that any number of directions may be controlled by suitable alteration of the control means. Also, the periods 5 and 5-A, which have been described as traffic change periods, encompass other periods involving pedestrian walk and the like.

The traffic control means of this invention is adjustable to adjust the points 1 and 2 which start the control cycle portions and, hence, effectively operates to adjust the relative extents of the two control cycle portions and this is done without in any way affecting the extents of the traffic change periods. Likewise, the points 3 and 4 which terminate the traffic change periods, may be adjusted for adjusting the extents of the traffic change periods and this is accomplished without in any way affecting the extents of the control cycle portions.

Figure 1:
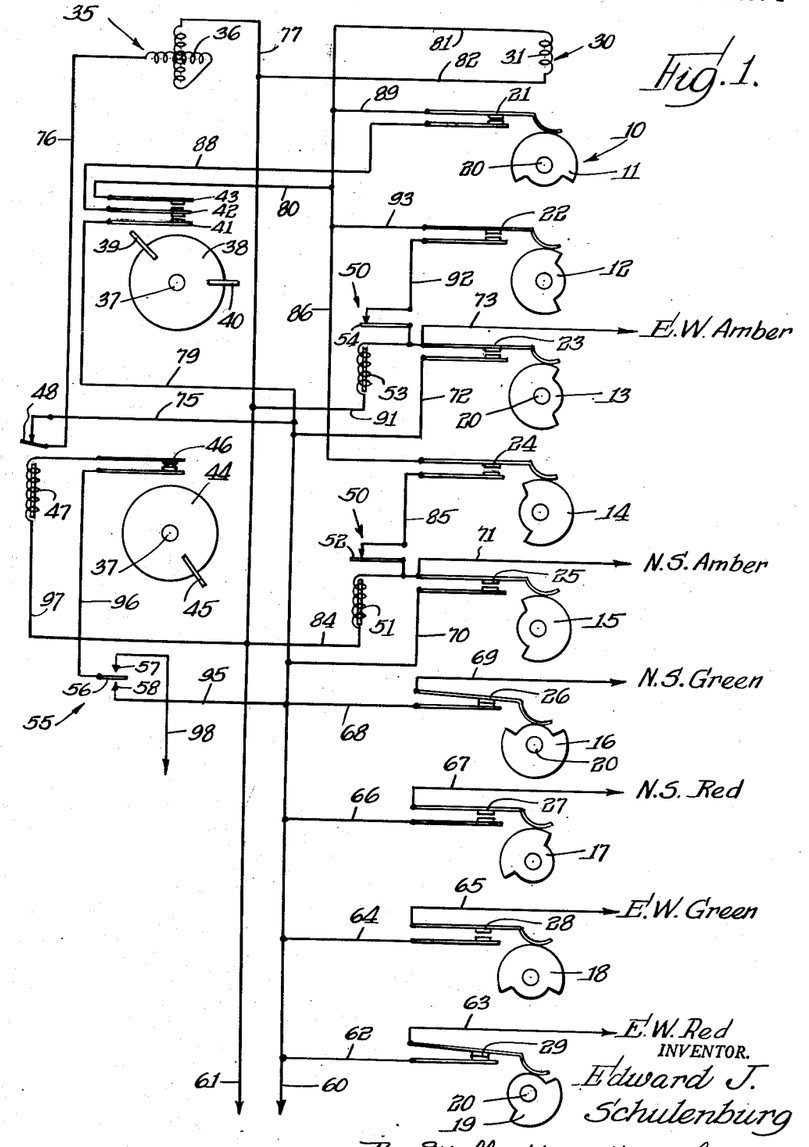
Fig. 1 is a diagrammatic illustration of the control means of this invention.
Figure 2:
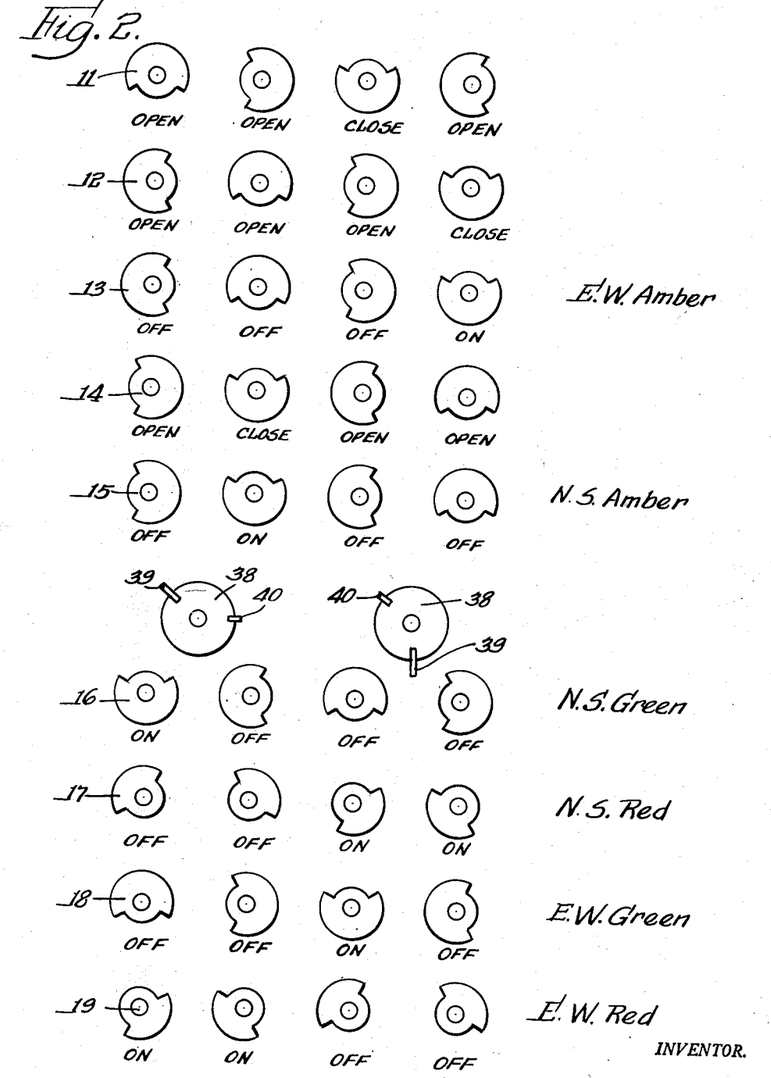
Fig. 2 is a diagram showing the positions of the various cams operating the control switch means during various periods of the control cycle.

Referring first to the form of the invention illustrated in Figs. 1 and 2, a control switch means for controlling the stop, go and change signals is generally designated at 10. This control switch means may take the form of the control switch means shown and described in my copending application Serial No. 229,411, filed June 1, 1951. For purposes of illustration, here it is shown to include a plurality of cams 11–19 carried by a cam shaft 20, which shaft, for simplicity, is shown to be intermittently advanced 90 rotative degrees per step.

The cam 11 operates a switch 21 which is an interlock switch operating with the first timing means. The cam 12 operates a switch 22 which is an isolating switch used in conjunction with the second timing means. The cam 13 operates a switch 23 which controls the east-west amber, or traffic change signal, and which also controls the second timing means. The cam 14 operates a switch 24 which is also an isolating switch for the second timing means. The cam 15 operates a switch 25 which controls the north-south amber, or traffic change signal, and which also controls the second timing means. The cam 16, 17, 18 and 19 control switches 26, 27, 28 and 29, respectively, for controlling, respectively, the north-south green or go signal, the north-south red or stop signal, the east-west green or go signal and the east-west red or stop signal.

The cam shaft 20 is intermittently advanced by means of a solenoid actuator generally designated at 30 and which may take the form illustrated and described in my copending application Serial No. 229,412, filed June 1, 1951. The solenoid actuator includes a pawl and ratchet (not shown) for intermittently advancing the cam shaft 20, the pawl and ratchet being operated by a solenoid winding 31. The arrangement is such that when the solenoid winding is energized the pawl is cocked or positioned so that upon deenergization of the solenoid winding 31 the pawl advances to step the cam shaft 20 through 90 rotative degrees. In other words, energization of the solenoid 31 merely cocks the actuator and the cam shaft 20 is not advanced until the solenoid 31 is deenergized.

The first timing means for controlling the starting of the control cycle portions is generally designated at 35. It includes a normally continuously operating constant speed electric motor having windings 36 for rotating at constant speed a shaft 37. The shaft 37 carries a timing dial 38 upon which are adjustably positioned cam members 39 and 40, the cam member 39 being longer than the cam member 40. These cam members 39 and 40, upon rotation of the timing dial 38, operate a switch having three contact blades 41, 42 and 43. When the cam member 39 engages the contact blade 41 the three contact blades 41, 42 and 43 are brought together to complete an electrical circuit between the outer contact blades 41 and 43. When, however, the shorter contact member 40 engages the contact blade 41, it is moved into engagement with the contact blade 42, thus completing an electrical circuit between the contact blades 41 and 42. Under these conditions the contact blade 42 is not moved into engagement with the contact blade 43. This switch comprising these contact blades 41, 42 and 43 cooperate with the interlock switch 21 for controlling the solenoid actuator 30. The first timer 35 also includes a synchronizing dial 44 carried by the shaft 37, this synchronizing dial adjustably carrying a cam member 45 which is adapted upon rotation of the synchronizing dial 44 to engage and close a switch 46.

Associated with the synchronizing switch 46 is a relay having an operating coil 47 and a normally closed switch 48. When the relay coil 47 is deenergized the switch 48 closes and, conversely, when the relay coil 47 is energized the switch 48 is opened.

The second timing means which terminates the traffic change periods is generally designated at 50 and it includes a pair of time delay relays. One of the relays includes a relay winding 51 and a normally closed switch 52 and the other relay includes a relay winding 53 and a normally closed switch 54. When the relay windings are deenergized the switches are closed. When the relay windings are energized the switches open following a predetermined time interval. The time interval, or time delay, may be regulated by the use of appropriate copper slugs in the magnetic circuits of the time delay relays. Of course, the relays may have different time delay periods as desired.

Associated with the first timing means 35 is a synchronizing control switch generally designated at 55. It is a three position single-pole double-throw switch having a center switch blade 56 and contacts 57 and 58.

Electrical energy is supplied to the control means and to the stop, go and change signals by means of line wires 60 and 61 leading from a source of power, not shown. The line wire 60 is connected through conductor 62, switch 29 and conductor 63 to the east-west red or stop signal. Likewise, the line wire 60 is connected through conductor 64, switch 28 and conductor 65 to the east-west green or go signal. Line wire 60 is also connected through conductor 66, switch 27 and conductor 67 to the north-south red or stop signal. Line wire 60 is further connected through conductor 70, switch 25 and conductor 71 to the north-south amber or traffic change signal. Finally, line wire 60 is connected through conductor 72, switch 23 and conductor 73 to the east-west amber or traffic change signal. The various stop, go and traffic change signals may also be connected to the other line wire 61 by suitable return conductors, not shown. Thus, as the control switch means 10 is intermittently advanced, the various stop, go and traffic change signals are operated in the desired sequence.

The motor 36 of the first timing means 35 is connected across the line wires 60 and 61 by means of a circuit extending from the line wire 60 through conductor 75, the normally closed switch 48, conductor 76, motor winding 36 and conductor 77 leading to the other line wire 61. Thus, the first timing means is normally continuously operating.

With the parts in the position illustrated in Fig. 1 and with the cams in the position illustrated in the first column of Fig. 2, the traffic control system is operating in the last part of the second control cycle portion, namely, at a point in the cycle between the lines 4—1 of Fig. 5. The cam 19 has its switch closed to the east-west red signal with the result that that signal is on. The cam 16 has its switch closed so that the north-south green signal is also on. All of the other cams have their respective switches open so that the amber signals are off and the east-west green and the north-south red signals are off. The first timing means 35 is operating to advance the long cam member 39 toward the timing switch 41, 42 and 43.

When the cam member 39 closes the switch 41, 42 and 43, a circuit is completed from the line wire 60 through conductor 79, switch blades 41, 42 and 43, conductors 80 and 81, solenoid 31 and conductor 82 back to the other line wire 61. This energizes the solenoid 31 which in turn cocks the solenoid actuator 30 for operation. When the long cam member 39 rides out from underneath the switch blade 41 this circuit is opened and the solenoid 31 is deenergized to advance the cams 11-19 through 90 rotative degrees in a clockwise direction. The cams 11-19 then assume the position illustrated in the second column of Fig. 2. The east-west red signal remains on, the north-south green signal is turned off and the north-south red and the east-west green signals remain off. The north-south amber signal is turned on by the cam 15 which at this time closes its switch 25. Thus the traffic control system is in the traffic change period between the lines 1—3 of Fig. 5. At this same time, the cam 14 closes its switch 24.

Closure of the switch by the cam 15, in addition to turning on the north-south amber signal, also completes a circuit through the relay winding 51 of the time delay relay 50, the circuit extending from the line wire 60 through conductor 70, switch 25, relay winding 51 and conductor 84 to the other line wire 61. Because of the time delay characteristic of this relay, it is not operated until the lapse of a predetermined time interval. At the same time a circuit is completed from the line wire 60 through conductor 70, switch 25, normally closed switch 52 of the time delay relay, conductor 85, isolating switch 24, conductors 86 and 81, solenoid 31 and conductor 82 back to the other line wire 61. This cocks the solenoid actuator for its next operation. After the time interval, determined by the time delay relay 51, the relay operates to open the normally closed switch 52 which breaks the last mentioned circuit and deenergizes the solenoid 31. As a result, the cams 11-19 are advanced to the position illustrated in the third column of Fig. 2. This stepping of the cams terminates the traffic change period of the first control cycle portion, as represented by the line 3 in Fig. 5. The extent of the traffic change period is determined by the time constant of the time delay relay 51.

With the cams in this position the east-west red signal is turned off, the east-west green signal is turned on, the north-south red signal is turned on, the north-south green signal remains off and the north-south amber signal is turned off. Of course, the east-west amber signal remains off. At this time the isolating cam 14 opens its switch 24 and the interlock cam 11 closes its switch 21. Thus the traffic control system is in the latter part of the first control cycle portion between the lines 3—2, as illustrated in Fig. 5.

The first timing means 35 continues to operate and when the short cam member 40 closes the time switch blades 41 and 42 a circuit is completed from the line wire 60 through conductor 79, switch blades 41 and 42, the conductor 88, interlock switch 21, conductors 89 and 81, solenoid 31 and conductor 82 back to the line wire 61. This circuit energizes the solenoid 31 and cocks the solenoid actuator for its next operation. When the short contact member 40 rides out from underneath the contact blade 41, the contact blades 41 and 42 separate to break the circuit and deenergize the solenoid 31, whereupon the cams 11—19 are advanced through 90 rotative degrees to the positions illustrated in the fourth column of Fig. 2. This operation starts the second control cycle portion, as indicated by the line 2 of Fig. 5.

In this position the cam 18 opens its switch 28 to turn off the east-west green signal and the cam 13 closes its switch 23 to turn on the east-west amber signal. The east-west red signal remains off, the north-south red signal remains on, the north-south green signal remains off and, of course, the north-south amber signal remains off. At this same time the cam 11 opens its interlock switch 21 and the cam 12 closes its isolating switch 22. Closure of the switch 23 by the cam 13, in addition to turning on the east-west amber signal, also completes a circuit through the relay winding 53 of the other time delay relay 50, the circuit extending from the line wire 60 through conductor 72, switch 23, relay winding 53 and conductor 91 back to the other line wire 61. However, this time delay relay 53 does not then operate because of its time delay characteristic. At this same time another circuit is completed from the line wire 60 through conductor 72, switch 23, normally closed switch 54 of the time delay relay 53, conductor 92, isolating switch 22, conductors 93 and 81, solenoid 31 and conductor 82 back to the other line wire 61. This latter circuit energizes the solenoid 31 and cocks the solenoid actuator for operation. Following a time interval, determined by the time delay constant of the time delay relay 53, the normally closed switch 54 opens to break this last mentioned circuit to deenergize the solenoid 31, whereupon the cams 11–19 are advanced to the position illustrated in the first column of Fig. 2. This operation of the cams 11–19 terminates the traffic change period of the second control cycle portion, as indicated by the line 4 in Fig. 5. The extent of the traffic change period is dependent upon the time constant of the time delay relay 53, which constant may be determined by the use of an appropriate copper slug in the magnetic path of the relay. The traffic control system is then in the latter part of the second control cycle portion between the lines 4—1 of Fig. 5 and the system is in condition for another complete cycle of operation.

The cam members 39 and 40, therefore, determine the positions of lines 1 and 2 of Fig. 5, namely, the starting of the two control cycle portions. By adjusting the positions of the cam members 39 and 40 these points in the cycle may be varied at will without in any way affecting the extents of the traffic change portions of the cycles. The points 3 and 4 of Fig. 5, where the traffic change portions of the cycle terminate, are controlled by the time constants of the relays of the second timing means 50 and the extents of these traffic change portions may be adjusted by changing the time constants of the time delay relays and this may be done without in any way affecting the extents of the control cycle portions. The control system is, therefore, extremely flexible and may be readily adapted for various traffic conditions.

In the foregoing description no reference has been made to the synchronizing means for the first timing means 35, the description being predicated on the synchronizing control switch 55 being located in the mid-position as shown in Fig. 1. By moving the switch blade 56 of the synchronizing control switch 55 into engagement with the contact 58, the control means of this invention may be manually synchronized to operate in conjunction with similar control means for other related traffic control signals. The cam member 45 on the synchronizing dial 44 of the first timing means 35 is adapted to close the switch 46 in each control cycle and, as illustrated, it will close this switch 46 during the latter part of the first control cycle portion between the lines 3—2 of Fig. 5. When this occurs a circuit is completed from the line wire 60 through conductor 95, contact 58, switch blade 56, conductor 96, switch 46, relay coil 47 and conductor 97 back to the other line wire 61. This circuit energizes the relay winding 47 to open the normally closed switch 48, which in turn stops operation of the first timing means 35. At the proper time, depending upon the other traffic control units, the switch blade 56 may be moved out of engagement with the contact 58 to open this circuit and allow the switch 48 to close for restarting the timing means 35. Thus, the timing means may be manually synchronized with other traffic control units.

The timing means may also be automatically synchronized with other timing units by moving the switch blade 56 into engagement with the contact 57 and this sychronizing action may take place during each control cycle of operation. In this connection, a master controller, not illustrated, sends out an electrical pulse to all of the associated control units so that all of the control units may be brought into proper step, that is, automatically synchronized. The electrical pulse is conducted to the control means from the master controller through conductor 98, connecting with contact 57, and this pulse begins prior to the time that the cam member 45 would normally engage the switch 46. When the switch 46 is closed, while the electrical pulse is present, a circuit is completed from the conductor 98 through contact 57, switch blade 56, conductor 96, switch 46, relay coil 47 and conductor 97 back to the line wire 61. This energizes the relay coil 47 to open the normally closed contact 48 and stop the timing means 35. The timing means 35 remains stopped until the pulse transmitted by the master controller ceases, whereupon the relay coil 47 becomes deenergized and the switch 48 closes to restart the timing means. Thus, all of the control units are in this manner automatically synchronized by means of a master controller. The position of the cam member 45 on the timing dial 44 is positioned in all of the control units so that the synchronizing time occurs during a stop period in the various control units. In this way, the extents of the traffic change periods in the various control units are unaffected.

Figure 3:
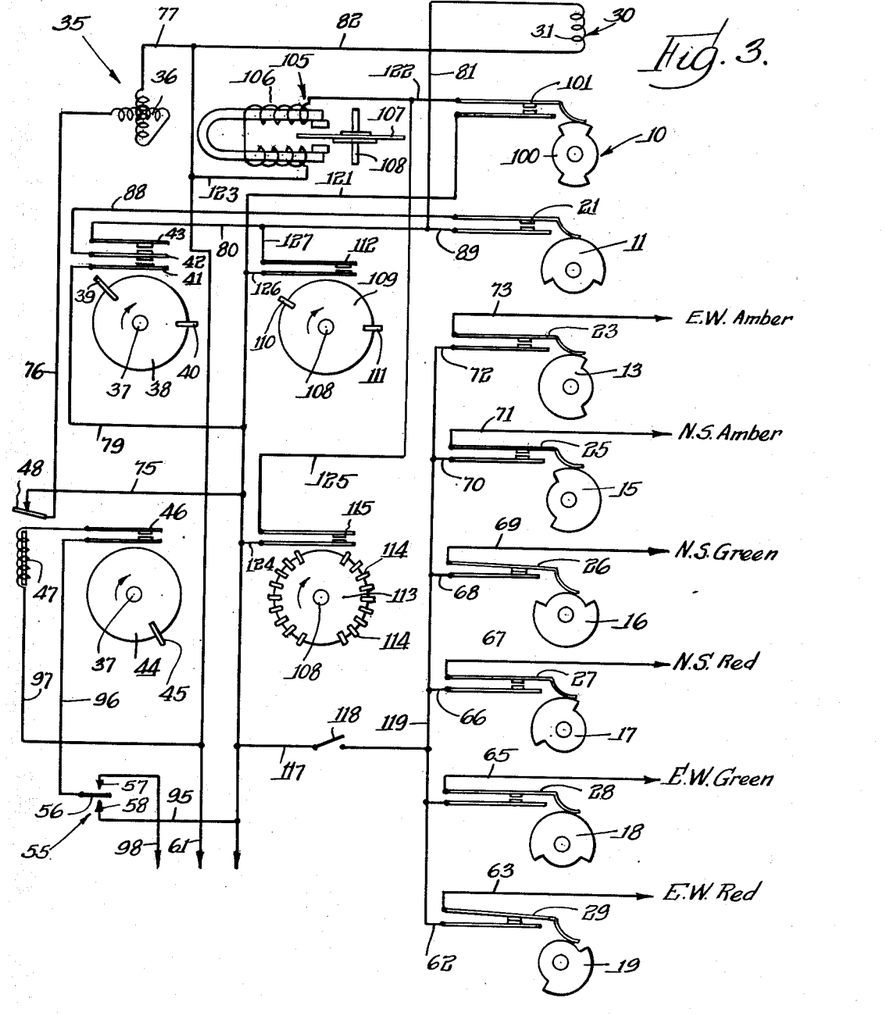
Fig. 3 is a diagrammatic illustration of another form of the control means of this invention.

Another form of the control means is illustrated in Figs. 3 and 4. Basically, this control means is very much like that of the control means of Figs. 1 and 2. The essential difference resides in the construction and operation of the second timing means, the second timing means being generally designated at 105 in Fig. 3. Throughout the drawings like reference characters are utilized for like parts.

The control switch means generally designated at 10 in Fig. 3 is like that of Fig. 1 utilizing the same cams 11, 13, 15, 16, 17, 18 and 19 and the switches operated thereby. However, the isolating cams 12 and 14 and their associated switches of Fig. 1 are omitted in Fig. 3 and are replaced by a timing control cam 100 for operating a timing control switch 101. This timing control switch 101 controls the operation of the second timing means, generally designated at 105.

The second timing means 105 includes a normally inactive constant speed electric motor having operating windings 106 and a rotor 107 for operating a shaft 108. A timing dial 109 is carried and rotated by the shaft 108 and it adjustably carries a pair of contact members 110 and 111 for closing a switch 112. The switch 112 is normally open and is closed by the cam members 110 and 111. The shaft 108 also carries a second timing dial 113 which adjustably carries a plurality of cam members 114 which in effect form high cam dwells for maintaining a switch 115, normally closed. When, however, the timing dial 113 assumes the position illustrated in Fig. 3, or assumes a position 180 degrees away, the switch 115 opens. The timing dial 109 and the switch 112 operate to control the solenoid actuator 30 to terminate the traffic change periods. The timing dial 113 and the switch 115 operate to control the motor 106 of the second timing means to reset the same to fixed positions preparatory to starting the timing periods produced by the second timing means 105.

The construction and operation of the first timing means 35 of Fig. 3 are the same as those of the first timing means 35 of Fig. 1. With the parts in the position illustrated in Fig. 3 and with the cams in the positions illustrated in the first column of Fig. 4, the traffic control system is in the last part of the second control cycle portion, namely, between the lines 4 and 1 of Fig. 5. The east-west red or stop signal is on, the north-south green or go signal is on, the east-west green or go signal and the north-south red or stop signal are off, and the east-west amber and north-south amber signals are off.

When the long cam member 39 closes the switch 41, 42 and 43 and thereafter opens the same, the solenoid actuator 30 is operated, as in the previous form of the invention, to advance the cams of the control switch means 10 through 90 rotative degrees to the position shown in the second column of Fig. 4. This is represented by the line 1 in Fig. 5 and is the beginning of the first cycle control portion. In this position the north-south green signal is turned off, the north-south red signal and east-west green signal remain off, the east-west red signal remains on, and the north-south amber signal is turned on just as in the previous form of the invention. Of course, the east-west amber signal remains off. The power is supplied to the various traffic control signals from the line wire 60 through conductor 117, switch 118 and conductor 119. The switch 118 may be manually opened to turn off all of the traffic control signals, if this should be desired.

With the cams in the position shown in the second column of Fig. 4 the control system is in the traffic change period, namely, between the lines 1 and 3 of Fig. 5. When the cams are rotated to this position the cam 100 closes the timing control switch 101 to complete a circuit from the line wire 60 through conductor 121, timing control switch 101, conductor 122, motor winding 106 and conductor 123 back to the other line wire 61. This starts the motor of the second timing means 105. As soon as the motor starts, the timing dial 113 closes the switch 115 for completing a circuit through the timing means to maintain it in operation until the shaft 108 rotates through 180 rotative degrees. Closure of this switch 115 completes a circuit from the line wire 60 through conductor 124, switch 115, conductor 125, motor winding 106 and conductor 123 back to the line wire 61. This circuit maintains the motor in operation for the 180 degree rotation, whereupon the switch 115 opens to break this maintaining circuit. At a point in this 180 degrees rotation of the second timing means the cam member 110 closes the switch 112 to complete a circuit from the line wire 60 through conductor 126, switch 112, conductors 127 and 81, solenoid winding 31 and conductor 82 back to the other line wire 61. This energizes the solenoid 31 for cocking the solenoid actuator. When the cam member 110 advances past the switch 112, the switch opens to break this circuit, which in turn causes the solenoid actuator 30 to advance the cams to the position illustrated in the third column of Fig. 4. When this occurs the timing control switch 101 is opened so that it loses control of the operation of the motor 106, the motor continuing in operation for 180 de-
grees under the control of the switch 115. This advancing of the cams represents termination of the first traffic change period, as designated by the line 3 in Fig. 5. By adjusting the cam member 110 along the timing disc 109 within 180 degrees, the extent of the traffic change period between the lines 1 and 3 of Fig. 5 may be adjusted.

With the cams in the position illustrated in the third column of Fig. 4 the control system is in the last part of the first control cycle period, namely between the lines 3 and 2 of Fig. 5. When the short cam member 40 of the first timing means closes and opens the switch blades 41 and 42, the solenoid 31 is energized and deenergized, as in the preceding form of the invention, to advance the cams to the position illustrated in the fourth column of Fig. 4. This starts the second control cycle portion, as indicated by the line 2 in Fig. 5. Here the east-west green signal is turned off, the east-west red signal and the north-south green signal remain off, the north-south red signal remains on the east-west amber signal is turned on. Of course, the north-south amber signal remains off. The control system is, therefore, in the traffic change period of the second control cycle portion.

At this time the timing control cam 100 closes its switch 101 to complete a starting circuit for the motor winding 106 of the second timing means 105, in the manner indicated above. The motor is maintained in operation until the motor shaft 108 has rotated through 180 degrees by means of the switch 115 operated by the timing cam 113. As the motor so operates, the other cam member 111 of the timing dial 109 opens and closes the switch 112 to energize and deenergize the solenoid 31 to advance the cams to the position illustrated in the first column of Fig. 4, this being the end of the traffic change period, as designated by the line 4 in Fig. 5. The system is then in a position for recurrence of the control cycle. When the cams are advanced to this position the cam 100 opens the timing control switch 101 to place the motor of the second timing means solely under the control of the maintaining circuit extending through the switch 115, operated by the timing dial 113. By positioning the cam member 111 within 180 degrees on the timing dial 109, the extent of the traffic control period, between the lines 2 and 4 in Fig. 5, may be adjusted. As noted, the cam member 110 has a more advanced position on the timing dial 109 than the cam member 111 so that the traffic change period between lines 1—3 of Fig. 5 is less than the traffic change period between the lines 2—4. The actual extents and relative extents of these traffic change periods is directly dependent upon the positions of the cam members 110 and 111 on the timing dial 109. Also, the relative extents of the first and second control cycle portions between the lines 1—2 and 2—1 of Fig. 5 are directly dependent upon the positions of the cam members 39 and 40 of the timing dial 38 of the first timing means 35. Thus, free and independent adjustment of the various periods is readily provided. The essential difference between the form of the invention illustrated in Fig. 3 and that illustrated in Fig. 1 is in the ease in which the extents of the traffic change periods may be regulated. The manner of synchronizing the control means of Fig. 3 is the same as that of the control means of Fig. 1.

While for purposes of illustration two forms of this invention have been disclosed, other forms thereof may become apparent to those skilled in the art upon reference to this disclosure and, therefore, this invention is to be limited only by the scope of the appended claims.

What I claim as my invention:

1. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a common actuator for the control switch means for sequentially operating the control switch means through said recurring cycles, first timing means connected to the common actuator for operating the control switch means to start each control cycle portion at predetermined time intervals, and second timing means connected to the common actuator for operating the control switch means to terminate the change period in each control cycle portion at predetermined time intervals following the starting of each control cycle portion.

2. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a common actuator for the control switch means for sequentially operating the control switch means through said recurring cycles, first timing means connected to the common actuator for operating the control switch means to start each control cycle portion at predetermined time intervals, second timing means connected to the common actuator for operating the control switch means to terminate the change period in each control cycle portion at predetermined time intervals following the starting of each control cycle portion, and adjusting means for the first timing means for adjusting the predetermined time intervals at which the control cycle portions are started and hence the relative extents of the control cycle portions.

3. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a common actuator for sequentially operating the control switch means through said recurring cycles, first timing means connected to the common actuator for operating the control switch means to start each control cycle portion at predetermined time intervals, second timing means connected to the common actuator for operating the control switch means to terminate the change period in each control cycle portion at predetermined time intervals following the starting of each control cycle portion, and adjusting means for the second timing means for adjusting the predetermined time intervals at which the change periods are terminated and hence the extents of the change periods.

4. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a solenoid actuator for the control switch means for sequentially operating the control switch means through said recurring cycles, first time switch means, interlock switch means operated by said solenoid actuator, electrical connections including said solenoid actuator, first time switch means and interlock switch means for controlling the solenoid actuator for operating the control switch means to start each control cycle portion at predetermined time intervals, second time switch means controlled by said solenoid actuator, and electrical connections including said solenoid actuator and second time switch means for controlling the solenoid actuator for operating the control switch means to terminate the change period in each control cycle portion at predetermined time intervals following the starting of each time cycle portion.

5. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a solenoid actuator for the control switch means for sequentially operating the control switch means through said recurring cycles, first time switch means, interlock switch means operated by said solenoid actuator, electrical connections including said solenoid actuator, first time switch means and interlock switch means for controlling the solenoid actuator for operating the control switch means to start each control cycle portion at predetermined time intervals, second time switch means including timing means, electrical connections including said timing means and switch means operated by said solenoid actuator for operating the second time switch means, and electrical connections including said solenoid actuator and second time switch means for controlling the solenoid actuator for operating the control switch means to terminate the change period in each control cycle portion at predetermined time intervals following the starting of each time cycle portion.

6. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a solenoid actuator for the control switch means for sequentially operating the control switch means through said recurring cycles, first time switch means including a normally continuously operating timing means, interlock switch means operated by said solenoid actuator, electrical connections including said solenoid actuator, first time switch means and interlock switch means for controlling the solenoid actuator for operating the control switch means to start each control cycle portion at predetermined time intervals, second time switch means including normally inactive timing means, electrical connections including said normally inactive timing means and switch means operated by said solenoid actuator for operating the second time switch means, and electrical connections including said solenoid actuator and second time switch means for controlling the solenoid actuator for operating the control switch means to terminate the change period in each control cycle portion at predetermined time intervals following the starting of each time cycle portion.

7. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a solenoid actuator for the control switch means for sequentially operating the control switch means through said recurring cycles, first time switch means, interlock switch means operated by said solenoid actuator, electrical connections including said solenoid actuator, first time switch means and interlock switch means for controlling the solenoid actuator for operating the control switch means to start each control cycle portion at predetermined time intervals, second time switch means including time delay relay means, electrical connections including said time delay relay means and switch means operated by said solenoid actuator for operating the second time switch means, and electrical connections including said solenoid actuator and second time switch means for controlling the solenoid actuator for operating the control switch means to terminate the change period in each control cycle portion at predetermined time intervals following the starting of each time cycle portion.

8. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a solenoid actuator for the control switch means for sequentially operating the control switch means through said recurring cycles, first time switch means, interlock switch means operated by said solenoid actuator, electrical connections including said solenoid actuator, first time switch means and interlock switch means for controlling the solenoid actuator for operating the control switch means to start each control cycle portion at predetermined time intervals, second time switch means including a normally stationary motor, electrical connections including said normally stationary motor and switch means operated by said solenoid actuator for operating said normally stationary motor, and electrical connections including said solenoid actuator and second time switch means for controlling the solenoid actuator for operating the control switch means to terminate the change period in each control cycle portion at predetermined time intervals following the starting of each time cycle portion.

9. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a solenoid actuator for the control switch means for sequentially operating the control switch means through said recurring cycles, first time switch means, interlock switch means operated by said solenoid actuator, electrical connections including said solenoid actuator, first time switch means and interlock switch means for controlling the solenoid actuator for operating the control switch means to start each control cycle portion at predetermined time intervals, second time switch means controlled by said solenoid actuator, electrical connections including said solenoid actuator and second time switch means for controlling the solenoid actuator for operating the control switch means to terminate the change period in each control cycle portion at predetermined time intervals following the starting of each time cycle portion, and adjusting means for the first time switch means for adjusting the predetermined time intervals at which the control cycle portions are started and hence the relative extents of the control cycle portions.

10. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a solenoid actuator for the control switch means for sequentially operating the control switch means through said recurring cycles, first time switch means, interlock switch means operated by said solenoid actuator, electrical connections including said solenoid actuator, first time switch means and interlock switch means for controlling the solenoid actuator for operating the control switch means to start each control cycle portion at predetermined time intervals, second time switch means controlled by said solenoid actuator, electrical connections including said solenoid actuator and second time switch means for controlling the solenoid actuator for operating the control switch means to terminate the change period in each control cycle portion at predetermined time intervals following the starting of each time cycle portion, and adjusting means for the second time switch means for adjusting the predetermined time intervals at which the change periods are terminated and hence the extents of the change periods.

11. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a solenoid actuator for the control switch means for sequentially operating the control switch means through said recurring cycles, first time switch means, interlock switch means operated by said solenoid actuator, electrical connections including said solenoid actuator, first time switch means and interlock switch means for controlling the solenoid actuator for operating the control switch means to start each control cycle portion at predetermined time intervals, second time switch means controlled by said solenoid actuator, electrical connections including said solenoid actuator and second time switch means for controlling the solenoid actuator for operating the control switch means to terminate the change period in each control cycle portion at predetermined time intervals following the starting of each time cycle portion, adjusting means for the first time switch means for adjusting the predetermined time intervals at which the control cycle portions are started and hence the relative extents of the control cycle portions, and adjusting means for the second time switch means for adjusting the predetermined time intervals at which the change periods are terminated and hence the extents of the change periods.

12. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a common actuator for the control switch means for sequentially operating the control switch means through said recurring cycles, first timing means connected to the common actuator for operating the control switch means to start each control cycle portion at predetermined time intervals, second timing means connected to the common actuator for operating the control switch means to terminate the change period in each control cycle portion at predetermined time intervals following the starting of each control cycle portion, adjusting means for the first timing means for adjusting the predetermined time intervals at which the control cycle portions are started and hence the relative extents of the control cycle portions, and adjusting means for the second timing means for adjusting the predetermined time intervals at which the change periods are terminated and hence the extents of the change periods.

13. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a common actuator for the control switch means for sequentially operating the control switch means through said recurring cycles, first timing means connected to the common actuator for operating the control switch means to start each control cycle portion at predetermined time intervals, second timing means connected to the common actuator for operating the control switch means to terminate the change period in each control cycle portion at predetermined time intervals following the starting of each control cycle portion, and synchronizing means controlled by the first timing means for synchronizing said first timing means during a stop period in one of the control cycle portions.

14. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a solenoid actuator for the control switch means for sequentially operating the control switch means through said recurring cycles, a first timer including time switch means, a normally continuously operating constant speed motor, a timing dial operated by the motor and a plurality of cam members adjustably carried on the timing dial and operating the time switch means, interlock switch means operated by said solenoid actuator, electrical connections including said solenoid actuator, time switch means of the first timer and interlock switch means for controlling the solenoid actuator for operating the control switch means to start each control cycle portion at predetermined time intervals, a second timer including time switch means and time delay relay means for operating the time switch means, electrical connections including said time delay relay means and switch means operated by said solenoid actuator for operating said time switch means, and electrical connections including said solenoid actuator and time switch means of said second timer for controlling the solenoid actuator for operating the control switch means to terminate the change period in each control cycle portion at predetermined time intervals following the starting of each time cycle portion.

15. Control means for a traffic control system having stop, go and change signals for a plurality of directions comprising, control switch means for controlling the stop, go and change signals through recurring control cycles, each having one portion comprising change and stop periods for one direction and another portion comprising change and stop periods for another direction, a solenoid actuator for the control switch means for sequentially operating the control switch means through said recurring cycles, a first timer including time switch means, a normally continuously operating constant speed motor, a timing dial operated by the motor and a plurality of cam members adjustably carried on the timing dial and operating the time switch means, interlock switch means operated by said solenoid actuator, electrical connections including said solenoid actuator, time switch means of the first timer and interlock switch means for controlling the solenoid actuator for operating the control switch means to start each control cycle portion at predetermined time intervals, a second timer including time switch means, a normally inactive constant speed motor, a timing dial operated by the motor and a plurality of cam members adjustably carried on the timing dial and operating the time switch means, electrical connections including said normally inactive motor and switch means operated by said solenoid actuator for operating said time switch means, and electrical connections including said solenoid actuator and time switch means of said second timer for controlling the solenoid actuator for operating the control switch means to terminate the change period in each control cycle portion at predetermined time intervals following the starting of each time cycle portion.

16. Control means for a traffic control system having stop, go and change signals for a plurality of directions comprising a common sequentially operated control switch means for controlling the stop, go and change signals in recurring control cycles, first means including timing means for operating said control switch means to start at predetermined intervals one traffic change period, second means including timing means for operating said control switch means to terminate said one traffic change period and start a stop period in one direction a predetermined time after operation of said first means, third means including timing means for operating said control switch means to start at predetermined intervals another traffic change period, and fourth means including timing means for operating said control switch means to terminate said other traffic change period and start a stop period in another direction a predetermined time after operation of said third means.

17. Control means for a traffic control system having stop, go and change signals for a plurality of directions comprising a common sequentially operated control switch means for controlling the stop, go and change signals in recurring control cycles, first means including timing means for operating said control switch means to start at predetermined intervals one traffic change period, second means including timing means for operating said control switch means to terminate said one traffic change period and start a stop period in one direction a predetermined time after operation of said first means, third means including timing means for operating said control switch means to start at predetermined intervals another traffic change period, fourth means including timing means for operating said control switch means to terminate said other traffic change period and start a stop period in another direction a predetermined time after operation of said third means, and means for adjusting the timing means of the first and third means to adjust the relative extents of the stop periods in the different directions without affecting the extents of the traffic change periods.

18. Control means for a traffic control system having stop, go and change signals for a plurality of directions comprising a common sequentially operated control switch means for controlling the stop, go and change signals in recurring control cycles, first means including timing means for operating said control switch means to start at predetermined intervals one traffic change period, second means including timing means for operating said control switch means to terminate said one traffic change period and start a stop period in one direction a predetermined time after operation of said first means, third means including timing means for operating said control switch means to start at predetermined intervals another traffic change period, fourth means including timing means for operating said control switch means to terminate said other traffic change period and start a stop period in another direction a predetermined time after operation of said third means, and means for adjusting the timing means of the second and fourth means to adjust the extents of the traffic change periods without affecting the starting times of the traffic change periods.

19. Control means for a traffic control system having stop, go and change signals for a plurality of directions comprising a common sequentially operated control switch means for controlling the stop, go and change signals in recurring control cycles, first means including timing means for operating said control switch means to start at predetermined intervals one traffic change period, second means including timing means for operating said control switch means to terminate said one traffic change period and start a stop period in one direction a predetermined time after operation of said first means, third means including timing means for operating said control switch means to start at predetermined intervals another traffic change period, fourth means including timing means for operating said control switch means to terminate said other traffic change period and start a stop period in another direction a predetermined time after operation of said third means, means for adjusting the timing means of the first and third means to adjust the relative extents of the stop periods in the different directions without affecting the extents of the traffic change periods, and means for adjusting the timing means of the second and fourth means to adjust the extents of the traffic change periods without affecting the starting times of the traffic change periods.

EDWARD J. SCHULENBURG.

References Cited in the file of this patent

UNITED STATES PATENTS

| Number | Name | Date |
|---|---|---|
| 2,236,298 | Reid | Mar. 25, 1941 |
| 2,324,051 | Alles | July 13, 1943 |